United States Patent
Lam et al.

(10) Patent No.: US 7,536,777 B2
(45) Date of Patent: May 26, 2009

(54) USE OF METAL CAPPED SEED LAYERS FOR THE FABRICATION OF PERPENDICULAR THIN FILM HEADS

(75) Inventors: Hieu Lam, Milpitas, CA (US); Patrick Rush Webb, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 202 days.

(21) Appl. No.: 11/595,764

(22) Filed: Nov. 10, 2006

(65) Prior Publication Data

US 2008/0110761 A1    May 15, 2008

(51) Int. Cl.
*G11B 5/127*    (2006.01)
*H04R 31/00*    (2006.01)

(52) U.S. Cl. .............. 29/603.16; 29/603.11; 29/603.13; 29/603.15; 29/603.18; 205/119; 205/122; 216/62; 216/65; 216/66; 360/121; 360/122; 360/317; 451/5; 451/41

(58) Field of Classification Search ............. 29/603.07, 29/603.13–603.16, 603.18; 205/119, 122; 216/62, 65, 66; 360/121, 122, 126, 317; 451/5, 41
See application file for complete search history.

(56) References Cited

U.S. PATENT DOCUMENTS

| | | | |
|---|---|---|---|
| 6,876,507 B2 | 4/2005 | Chen et al. | |
| 6,912,106 B1 | 6/2005 | Chen et al. | |
| 7,097,923 B2 | 8/2006 | Webb et al. | |
| 2004/0264066 A1 | 12/2004 | Shimizu et al. | |
| 2005/0068671 A1 | 3/2005 | Hsu et al. | |
| 2005/0239001 A1 | 10/2005 | Lee et al. | |
| 2005/0259355 A1 | 11/2005 | Gao et al. | |
| 2006/0044682 A1 | 3/2006 | Le et al. | |
| 2006/0174474 A1 | 8/2006 | Le | |
| 2007/0258167 A1* | 11/2007 | Allen et al. | ............. 360/126 |
| 2008/0113090 A1 | 5/2008 | Lam et al. | |

* cited by examiner

*Primary Examiner*—Paul D Kim
(74) *Attorney, Agent, or Firm*—Lorimer Labs; D'Arcy H. Lorimer

(57) ABSTRACT

Methods and structures for the fabrication of perpendicular thin film heads are disclosed. Prior to the deposition of shield structures, capped seed layers having a dual layer structure are utilized, improving photo resist adhesion and plated shield adhesion, without the need to deposit, then remove, traditional inorganic anti-reflection coatings prior to shield plating.

18 Claims, 12 Drawing Sheets

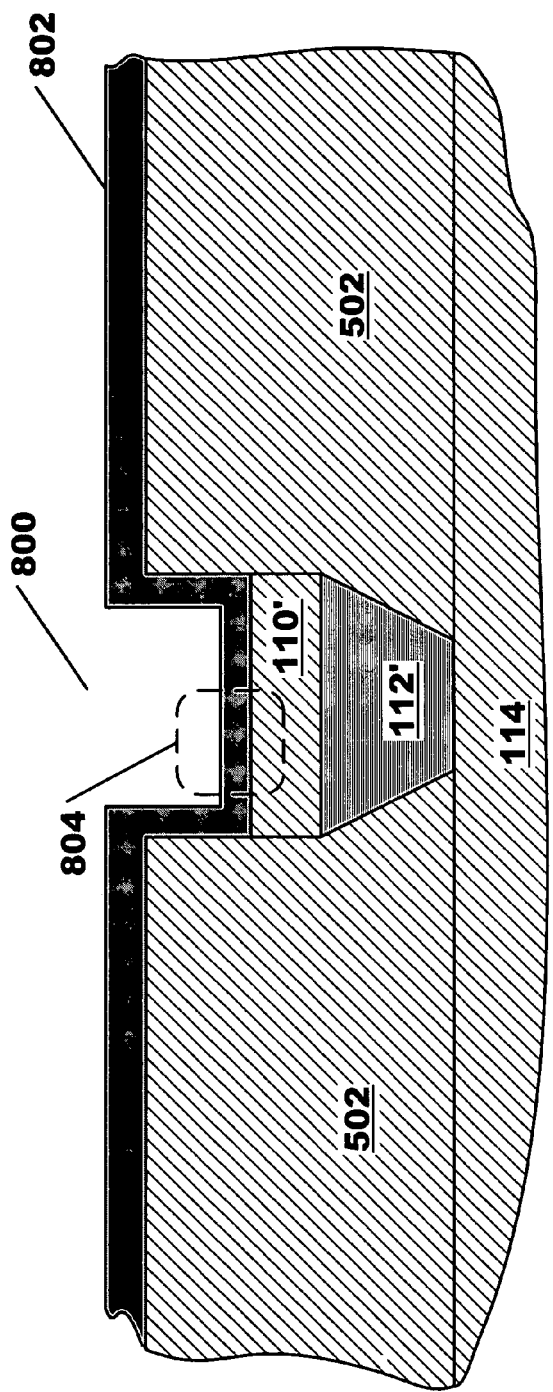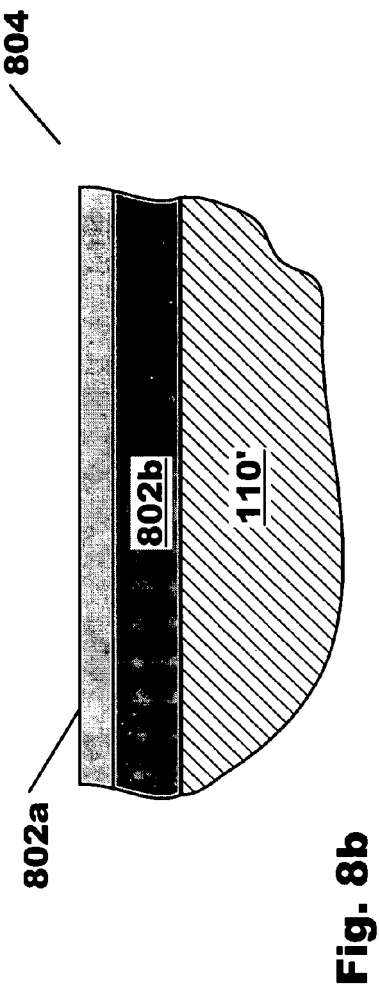
Fig. 8a
Fig. 8b

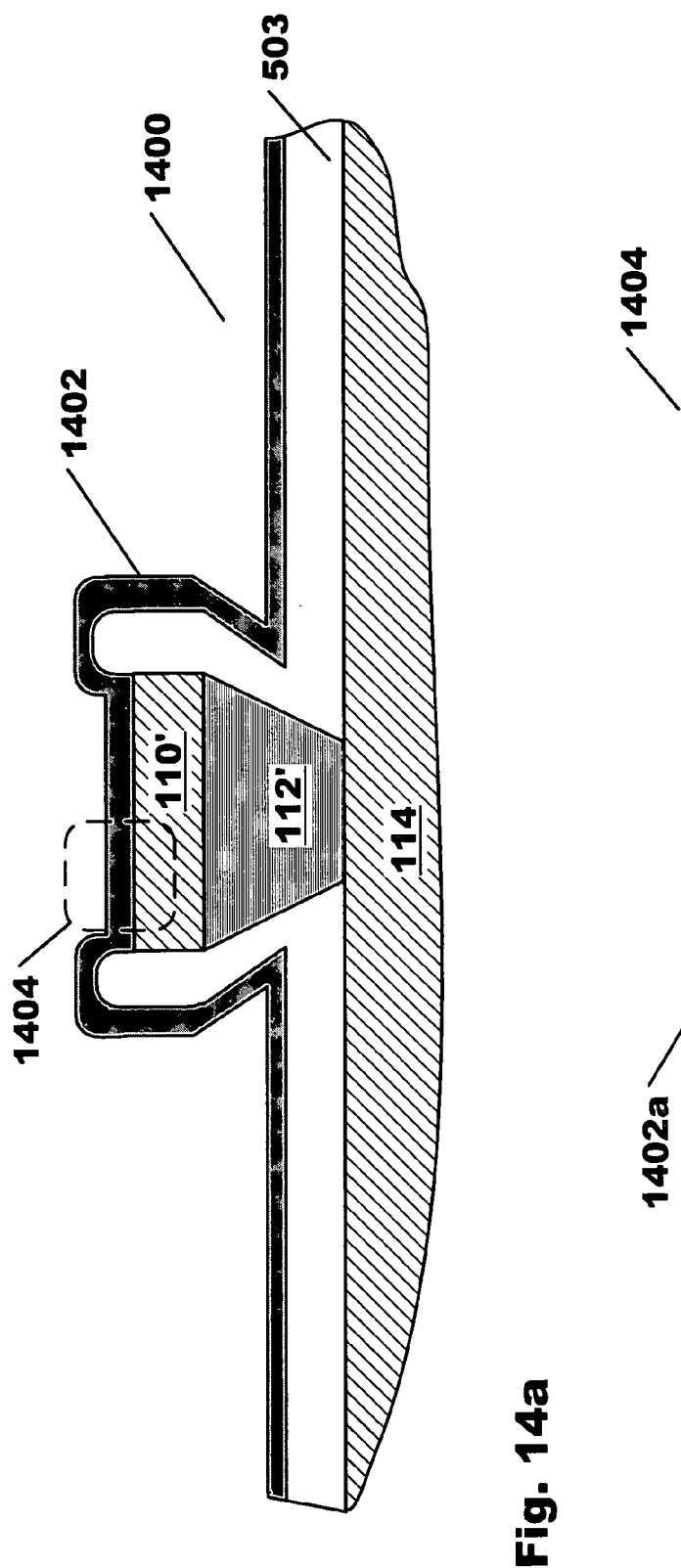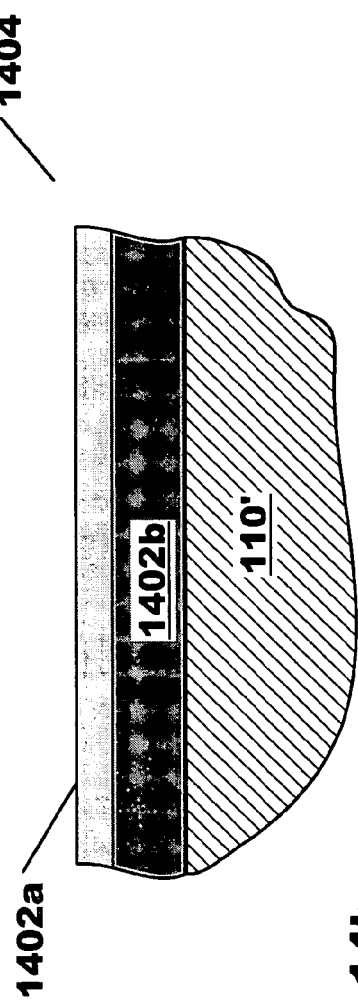
Fig. 14a
Fig. 14b

USE OF METAL CAPPED SEED LAYERS FOR THE FABRICATION OF PERPENDICULAR THIN FILM HEADS

BACKGROUND OF THE INVENTION

1. Field of the Invention

This invention relates to structures and methods for fabricating perpendicular write heads. More specifically, the invention relates to structures and methods for fabricating wrap around and trailing shields using metal capped seed layers prior to shield plating.

2. Description of the Related Art

Perpendicular write heads are currently well known in the art. Variants of such heads, having wrap around shields and trailing shields, have been recently disclosed. See, for example US Patent Application Publications 2005/0259355, 2006/0044682 and 2006/0174474, assigned to Hitachi Global Storage Technologies, Netherlands B.V.

During the fabrication of the wrap around shield of the prior art, a film stack containing the magnetic pole material, a non-magnetic gap layer, a CMP stop layer, and a number of image transfer layers are deposited. After the pole width is imaged and the film stack etched by a number of consecutive etch processes, a film stack containing the tapered pole material is created. A conformal non-magnetic layer is then deposited, which will serve as the side shield or wrap around shield gap material. Following deposition of the side gap material, a layer of RI-etchable material is deposited and the structure planarized by CMP. Following planarization, the RIE etchable material is removed leaving the tapered pole, main gap and side gap materials. A magnetic material is then deposited over this structure by electroplating to form the wrap around shield. Prior to plating, a conductive seed layer is deposited to provide a starting cathode for the plating process. Subsequent to seed layer deposition, a blanket photo resist layer is deposited. This layer is imaged and developed to provide a plating mask for the shield.

During the formation of trailing shields of the prior art, a film stack containing the magnetic pole material, a non-magnetic gap layer, a CMP stop layer, and a number of image transfer layers are deposited. The pole width is imaged and the film stack etched by a number of consecutive etch processes, creating a film stack containing the tapered pole material. A filler layer is deposited and the resulting structure planarized by CMP to the stop layer. A plating seed layer is subsequently deposited, followed by processes to make the photo resist plating mask.

Typically, Rh or NiCr seed layers are used in the prior art for both wrap around and trailing shield deposition. Rh seed layers may exhibit adhesion problems to the photo resist layer deposited over them, resulting in under-plating (plating of the shield under the photo resist) and photo resist failures. For the case of NiCr seed layers, these may oxidize prior to immersion in the plating bath, causing poor adhesion of the plated shield. The oxides formed on these seed layers are not easily removed by the plating bath chemistry. The photo resist adhesion problem to Rh seed layers can be mitigated by using an inorganic SiN based ARC (anti-reflection coating), but a separate RIE step is required to remove this coating prior to plating, which can damage the developed photo resist mask, detrimentally affecting critical dimension control.

What is needed is a better process for producing the warp around and trailing shields for the perpendicular write head.

United States Patent Application Publication 2006/0174474 discloses a mask structure for fabricating a write pole for a perpendicular write head. The mask structure includes a first and second hard mask structures separated by an image transfer layer, such as DURAMIDE. The first mask structure may be a bi-layer mask structure that functions as a CMP stop as well as a hard mask for ion milling. The first hard mask is chosen to have a desired resistance to removal by ion milling to maintain excellent track width control during an ion milling process used to form the write pole. Therefore, the first hard mask may be comprises of two layers selected from the group consisting of Rh, alumina, and diamond like carbon (DLC). The second hard mask is constructed of a material that functions as a bottom antireflective coating as well as a hard mask.

United States Patent Application Publication 2006/0044682 discloses a write element for use in perpendicular magnetic recording. The write element including a write pole and a self aligned wrap around shield that can have a trailing shield gap thickness that is different from its side shield gap thickness. The materials making up the trailing shield gap and the side shield gaps can be different materials or can be the same material deposited in two different steps. The side or wrap around portions of the trailing shield can extend down to the level of the leading edge of the write pole or can terminate at some point between the levels of the leading and trailing edge to form a partial wrap around trailing shield.

United States Patent Application Publication 2005/0239001 discloses methods of forming a component of a thin film magnetic head and improving the plating of a component of a thin film magnetic head. The methods include the use of a high activation energy chemically amplified photoresist (CARS) that is contacted with a low pH high saturation magnetic moment plating solution to form a magnetic head component that is essentially free of plating defects. The methods find utility in hard disk drive applications, such as in the manufacture of magnetic poles for the write head of a hard disk drive.

United States Patent Application Publication 2005/0259355 discloses a perpendicular write head including a main pole and a trailing shield, the main pole being made of a diamond-like carbon (DLC) layer as hard mask and a rhodium (Rh) layer as shield gap, both DLC and Rh layers being CMP stop layers so as to avoid corner rounding and damage from chemical mechanical planarization (CMP) process, the DLC layer being removed by reactive ion etching (RIE) to create a trench, the trailing shield being deposited into the trench for self alignment.

United States Patent Application Publication 2005/0068671 discloses a magnetic transducer with separated read and write heads for perpendicular recording. The write head has a trailing shield that extends from the return pole piece toward the main pole piece to form the write gap at the air-bearing surface. One embodiment of the trailing shield is a two part structure with a pedestal and a much smaller tip that confronts the main pole piece at the gap. In one embodiment a sink of non-magnetic, electrically conductive material is disposed in the separation gap between the read head and the flux bearing pole piece. The sink is preferably made of copper and does not extend to the ABS.

United States Patent Application Publication 2004/0264066 discloses at both end portions of at least a soft magnetic layer of a magneto-resistive effect film, a pair of bias magnetic field applying layers are disposed for applying a longitudinal bias magnetic field to the soft magnetic layer via magnetic underlayers. Further, mutual lattice point-to-point distances in the plane where each magnetic underlayer and the corresponding bias magnetic field applying layer are mated, are substantially equalized to each other. Therefore, a coercive force Hc in an in-plane direction (direction parallel to a film surface) of each bias magnetic field applying layer can be maintained at a high level so that even when further gap narrowing or track narrowing is aimed, the bias magnetic field applying layers can act to apply an effective bias magnetic field, i.e. can act to suppress occurrence of the Barkhausen noise.

U.S. Pat. No. 7,097,923 discloses a tri-layer anti-reflective coating for use in photolithographic applications, and specifically, for use in ultraviolet photolithographic processes. The tri-layered anti-reflective coating is used to minimize pattern distortion due to reflections from neighboring features in the construction of microcircuits. The tri-layer anti-reflection coating features a first layer, a first dielectric layer, an absorption layer disposed on the first dielectric layer, and a second dielectric layer, which is then disposed between the absorption layer and a photoresist layer. At least the absorption layer and dielectric layers can be formed using vacuum deposition. A unique character of the tri-layer anti-reflective coatings is that it dampens reflections structures having severe topologies and also allows a thinner anti-reflection layer that has a wider process latitude.

U.S. Pat. No. 6,912,106 discloses a method and system for providing a recording head is disclosed. The method and system include providing a first pole, a second pole, a write gap and at least one coil. The write cap separates the first pole from the second pole. The coil(s) include a plurality of turns and is between the first and second poles. The first pole includes a pedestal that has a first portion and a second portion. The first portion includes a high moment electroplated material. The second portion includes a hot seed layer that has a high moment sputtered material. The second portion of the first pole is adjacent to the write gap.

U.S. Pat. No. 6,876,507 discloses a thin-film write head employing pole pieces formed of an electroplated body-centered cubic (BCC) nickel-iron alloy with a saturation flux density ($B_S$) of 1.9 to 2.3 T (19 to 23 kG) and an acceptable coercivity ($H_C$) of about 80 to about 160 A/m (1-2 Oe). The iron content of the electroplated nickel-iron alloy is from 64% to 81% by weight. The two-layer pole fabrication process holds magnetic anisotropy and coercivity to useable values while improving saturation flux density and optimizing magnetostriction. This is accomplished by first electroplating a BCC nickel-iron layer onto an underlying seed layer and then annealing the two layers to reduce coercivity to less than about 160 amps/meter and raise magnetization to acceptable levels.

SUMMARY OF THE INVENTION

It is an object of the present invention to provide a method for making a perpendicular head including fashioning a pole structure on a surface of a substrate, the pole structure having a tapered pole section in contact with the substrate, and a gap layer deposited on the tapered pole section. The method further includes depositing a conductive base seed layer on the gap layer, depositing a conductive capping layer on the conducive base seed layer and, electroplating a shield layer on the conductive capping layer.

It is another object of the present invention to provide a method for making a perpendicular head including fashioning a pole structure on a surface of a substrate, the pole structure having a tapered pole section in contact with the substrate, and a gap layer deposited on the tapered pole section. The method further includes depositing a conductive base seed layer on the gap layer, depositing a conductive capping layer on the conducive base seed layer and, electroplating a wrap around shield layer on the conductive capping layer.

It is yet another object of the present invention to provide method for making a perpendicular head including fashioning a pole structure on a surface of a substrate, the pole structure having a tapered pole section in contact with the substrate, and a gap layer deposited on the tapered pole section. The method further includes depositing a conductive base seed layer on the gap layer, depositing a conductive capping layer on the conducive base seed layer and, electroplating a trailing shield layer on the conductive capping layer.

BRIEF DESCRIPTION OF THE DRAWINGS

The present invention will be better understood when consideration is given to the following detailed description thereof. Such description makes reference to the annexed drawings, wherein:

FIG. 8a is a partial cross sectional view looking into the air bearing surface (ABS) of the film structure subsequent to the deposition of seed/capping layer 802, during fabrication of a perpendicular write head with a trailing shield, in accordance with an embodiment of the present invention;

FIG. 8b is a partial cross sectional view of detail 804 of FIG. 8a, in accordance with an embodiment of the present invention;

FIG. 14a is a partial cross sectional view looking into the air bearing surface (ABS) of the film structure subsequent to the deposition of seed/capping layer 1402, during fabrication of a perpendicular write head with a wrap around shield, in accordance with an alternate embodiment of the present invention;

FIG. 14b is a partial cross sectional view of detail 1404 of FIG. 14a, in accordance with an alternate embodiment of the present invention; and, FIG. 15 is a partial cross sectional view looking into the air bearing surface (ABS) of the film structure subsequent to the deposition of wrap around shield 1502, in accordance with an alternate embodiment of the present invention.

DETAILED DESCRIPTION OF THE PREFERRED EMBODIMENTS

Figure 12:
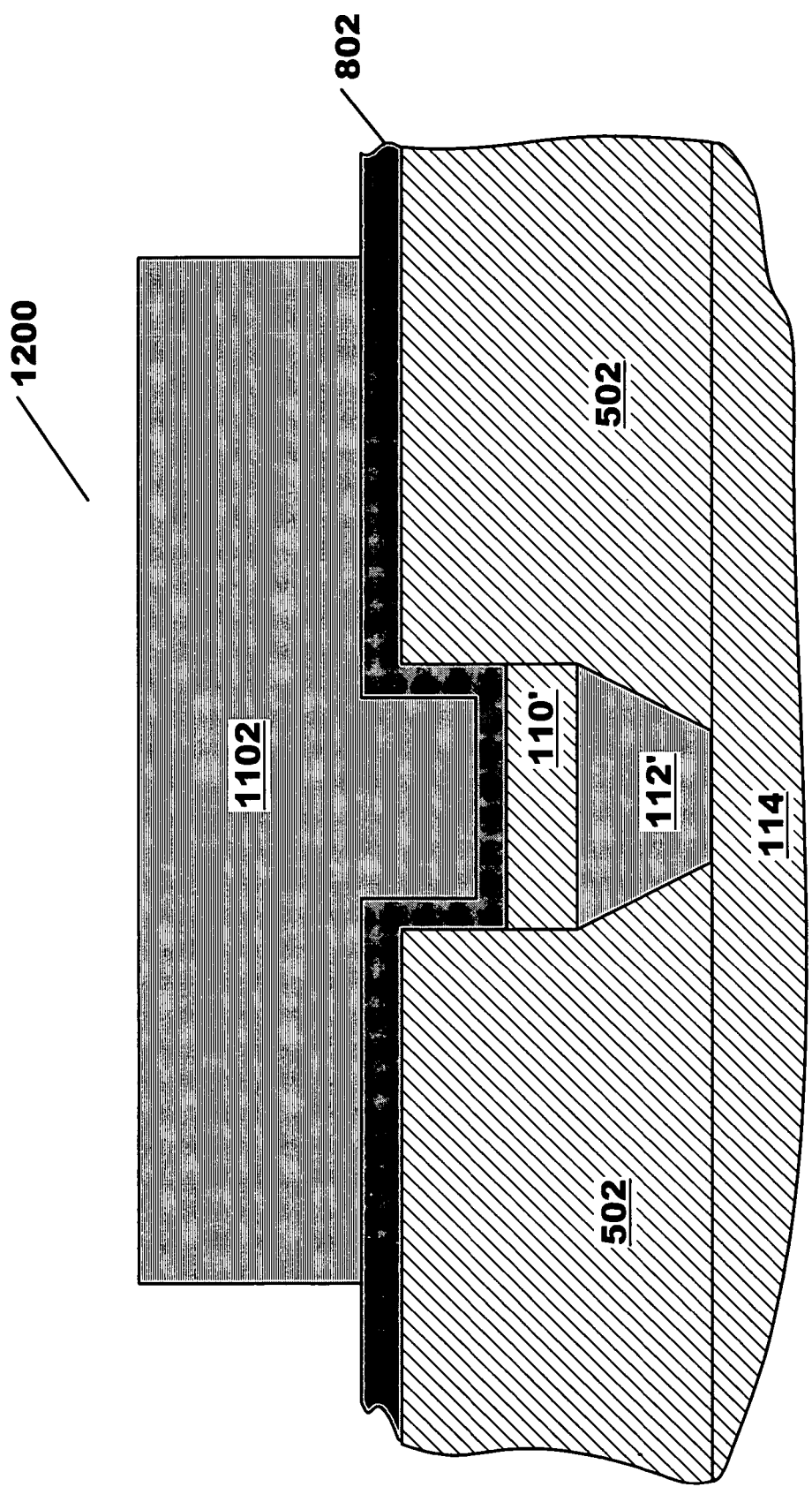
FIG. 12 is a partial cross sectional view looking into the air bearing surface (ABS) of the film structure subsequent to the removal of photo resist layer 902, during fabrication of a perpendicular write head with a trailing shield, in accordance with an embodiment of the present invention.
Figure 13:
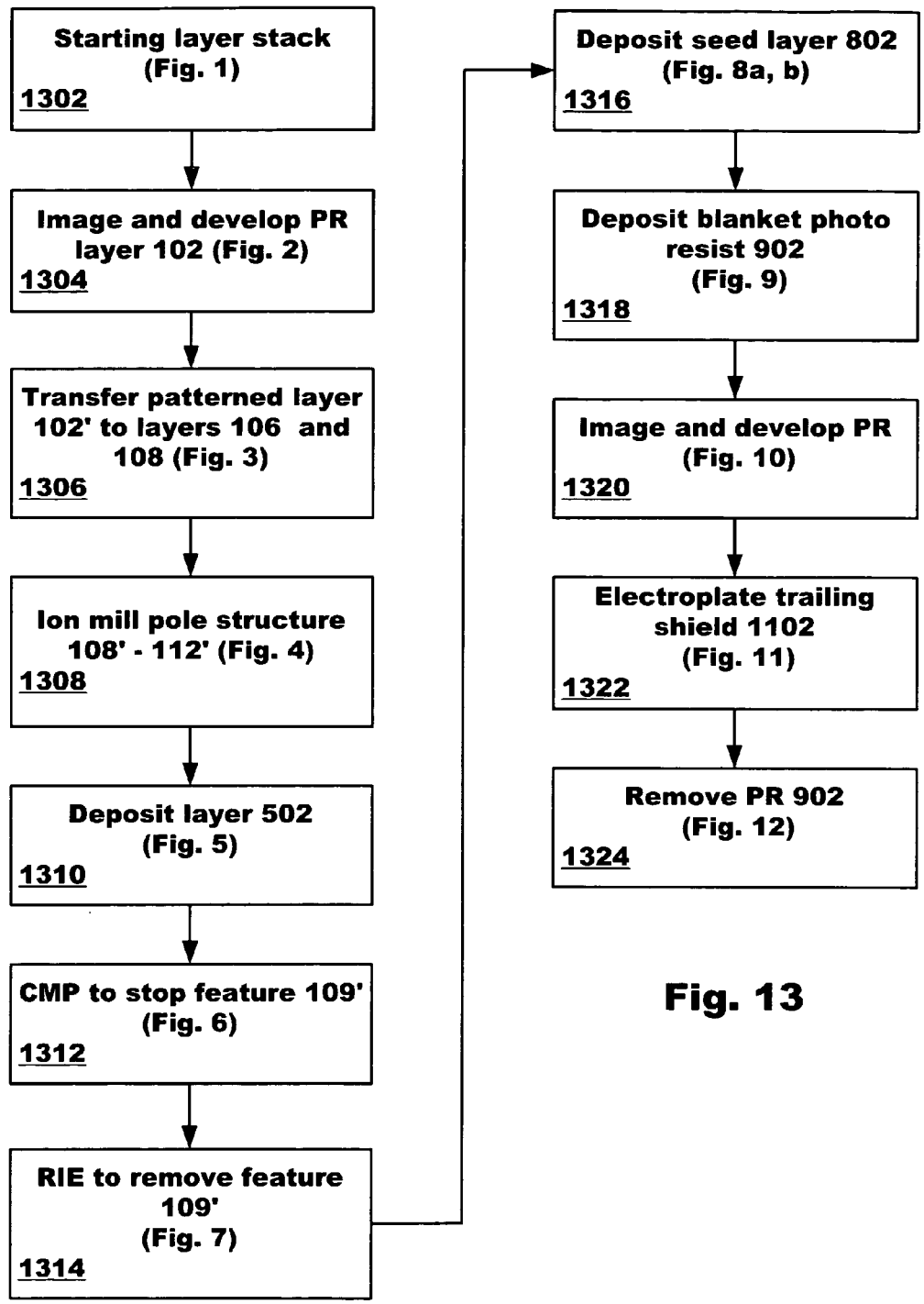
FIG. 13 is a schematic block diagram of the process for fabricating a trailing shield, in accordance with an embodiment of the present invention.

The features and description of one embodiment the present invention are best understood while viewing the cross sectional structure views (FIGS. 1-12) in light of the process block diagram FIG. 13, illustrating the use of capped seed layers during the formation of a perpendicular write head with a trailing shield. An alternate embodiment of the present invention is disclosed in FIGS. 14-15, which illustrates the use of capped seed layers during the formation of a perpendicular write head having a wrap around shield. Although these two example shield geometries have been chosen to illustrate the application of capped seed layers, application to these examples should not be taken as limiting, as the disclosed embodiments of the present invention may equally applicable to other shield or head geometries, as would be evident to those of skill in the art.

Figure 1:
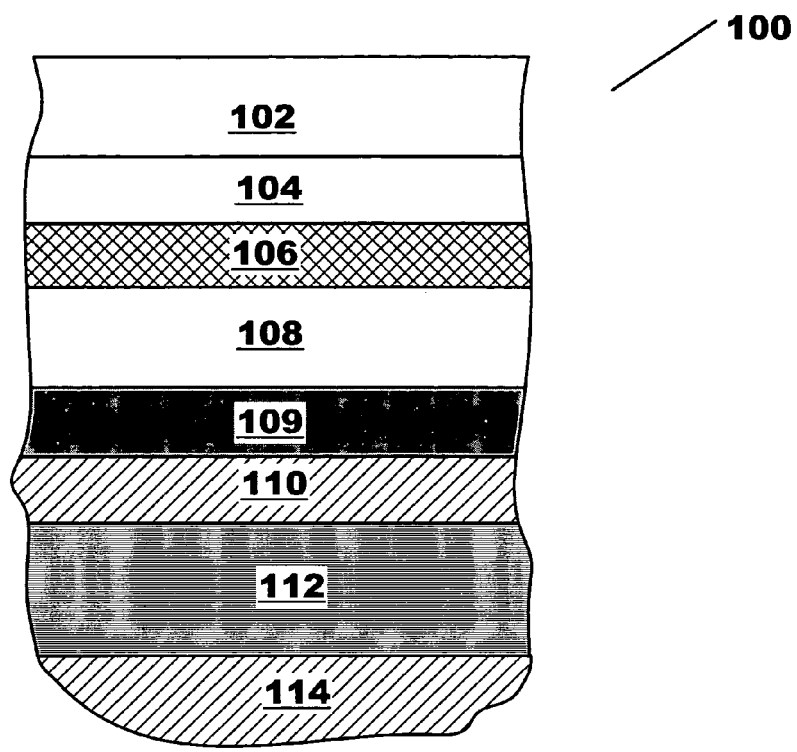
FIG. 1 is a partial cross sectional view looking into the air bearing surface (ABS) of a blanket deposited film stack prior to fabrication of a perpendicular write head with a trailing shield, in accordance with an embodiment of the present invention.

FIG. 13 is a schematic block diagram of the process for fabricating a trailing shield, in accordance with an embodiment of the present invention. The process begins at step 1302, wherein the layer stack of FIG. 1 is deposited. FIG. 1 is a partial cross sectional view 100 looking into the air bearing surface (ABS) of a blanket deposited film stack prior to fabrication of a perpendicular write head with a trailing shield, in accordance with an embodiment of the present invention. The film stack comprises blanket layers 102-112 deposited on substrate 114, which is typically alumina (at the air bearing surface), but may be other materials such as magnetic pole shaping layers deeper (further from the ABS) into the structure. For the purposes of this disclosure, substrate 114 can be a bulk material on which all subsequent layers are deposited, or it can be a layer deposited over previously deposited underlayers. For example, when fabricating a combined read and write head structure, the latter is usually the case, as the read head structure is generally deposited first (not shown). Layer 112 makes up the magnetic pole material, and is typically a laminated, multilayer structure comprising layers of magnetic and non-magnetic materials. Above pole layer 112 is gap layer 110, comprised of alumina or other non-magnetic materials. Preferably, alumina is used. Above gap layer is CMP stop layer 109. Typically, DLC (diamond like carbon) is used for this layer. A spacer layer 108 is deposited above DLC layer 109, and is comprised of Durimide. Above spacer layer 108, layers 102, 104, and 106 are deposited. Layer 102 comprises the imaging photo resist layer that defines the width and location of the write pole. Layers 104 and 106 aid in transferring the developed features of photo resist layer 102 to the spacer layer 108. Layer 106 is typically comprised of silica, and layer 104 is typically comprised of Durimide.

Figure 2:
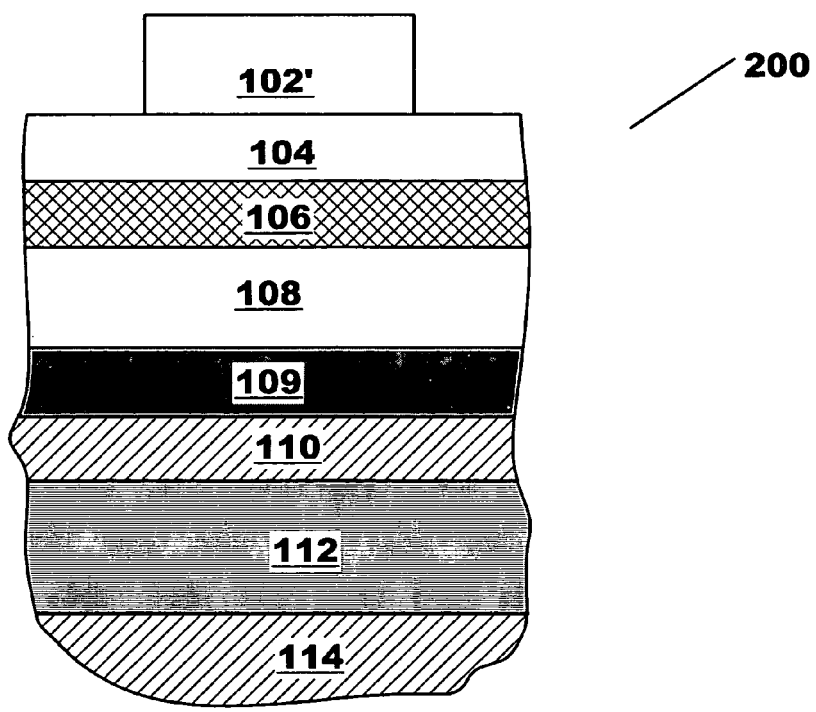
FIG. 2 is a partial cross sectional view looking into the air bearing surface (ABS) of the film structure following the imaging and development of photo-resist layer 102, during fabrication of a perpendicular write head with a trailing shield, in accordance with an embodiment of the present invention.

In step 1304 of FIG. 13, photo resist layer 102 is imaged and developed, creating feature 102' in FIG. 2. FIG. 2 is a partial cross sectional view 200 looking into the air bearing surface (ABS) of the film structure following the imaging and development of photo-resist layer 102, in accordance with an embodiment of the present invention.

Figure 3:
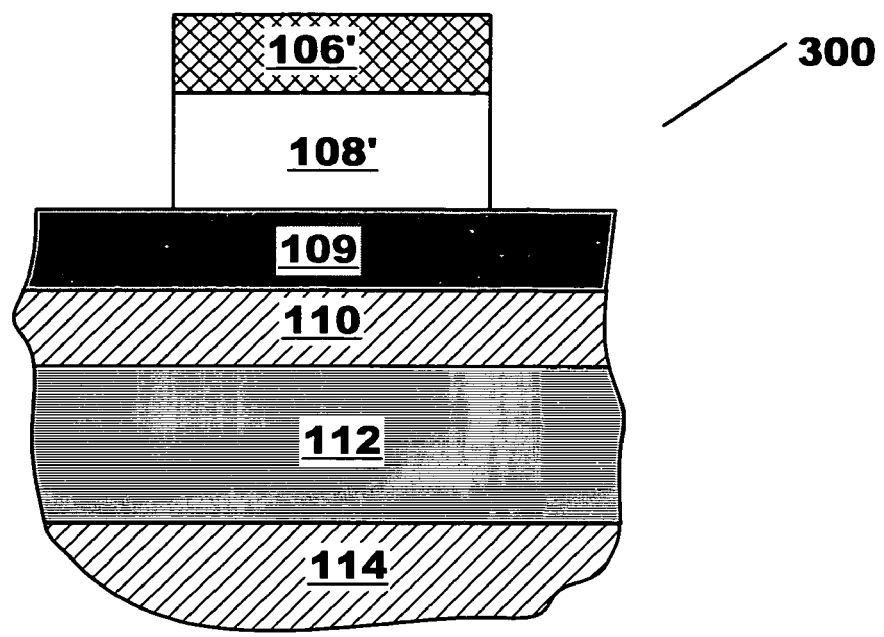
FIG. 3 is a partial cross sectional view looking into the air bearing surface (ABS) of the film structure subsequent to the transfer of patterned feature 102' into layers 106 and 108, during fabrication of a perpendicular write head with a trailing shield, in accordance with an embodiment of the present invention.

In step 1306 of FIG. 14, photo resist feature 102' is transferred to layers 106 and 108, creating features 106' and 108'. FIG. 3 is a partial cross sectional view 300 looking into the air bearing surface (ABS) of the film structure subsequent to the transfer of patterned feature 102' into layers 106 and 108, in accordance with an embodiment of the present invention. The transfer is carried out with three consecutive RIE process steps comprising a first oxidation step to etch layer 104, a second fluorine etch step to etch silica layer 106, followed by a third oxidation step to etch spacer layer 108. Details of the RIE processes are well known to those skilled in the art. During the oxidation steps, photo resist layer 102 is removed, resulting in structure 300.

Figure 4:
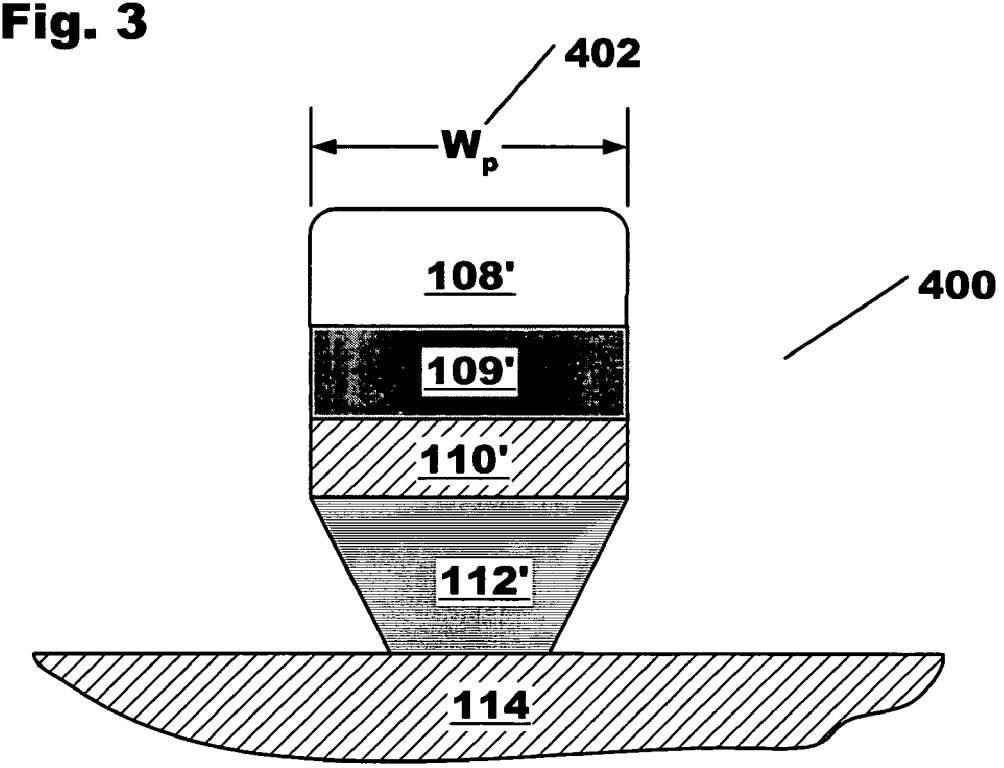
FIG. 4 is a partial cross sectional view looking into the air bearing surface (ABS) of the film structure subsequent to etching and ion milling to form the pole structure, during fabrication of a perpendicular write head with a trailing shield, in accordance with an embodiment of the present invention.

In step 1308 of FIG. 13, the structure of FIG. 3 is etched and ion milled to form the pole structure comprising features 108', 109', 110' and 112'. FIG. 4 is a partial cross sectional view 400 looking into the air bearing surface (ABS) of the film structure subsequent to etching and ion milling to form the pole structure, in accordance with an embodiment of the present invention. The width of the pole structure (108', 109', 110', 112') is $W_p$ 402. Details of the formation of the tapered pole section 112' have been previously disclosed in the prior art and are well known.

Figure 5:
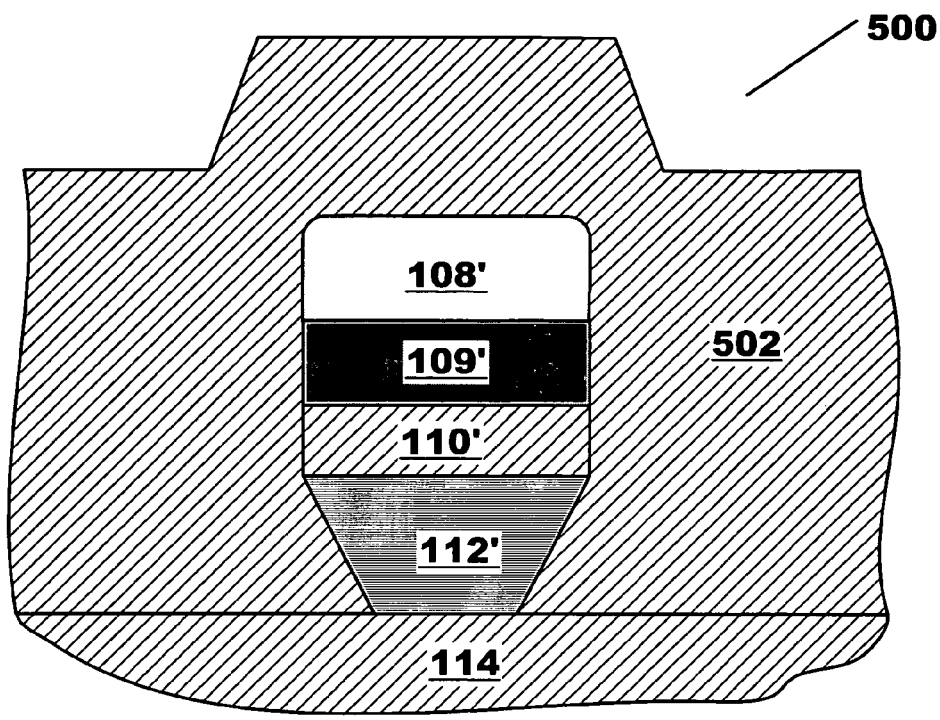
FIG. 5 is a partial cross sectional view looking into the air bearing surface (ABS) of the film structure subsequent to deposition of dielectric layer 502, during fabrication of a perpendicular write head with a trailing shield, in accordance with an embodiment of the present invention.

In step 1310 of FIG. 13, dielectric layer 502 is deposited around pole structure 108', 109', 110', 112'. FIG. 5 is a partial cross sectional view 500 looking into the air bearing surface (ABS) of the film structure subsequent to deposition of dielectric layer 502, in accordance with an embodiment of the present invention. Layer 502 typically comprises alumina, and is deposited by a process known to those skilled in the art.

Figure 6:
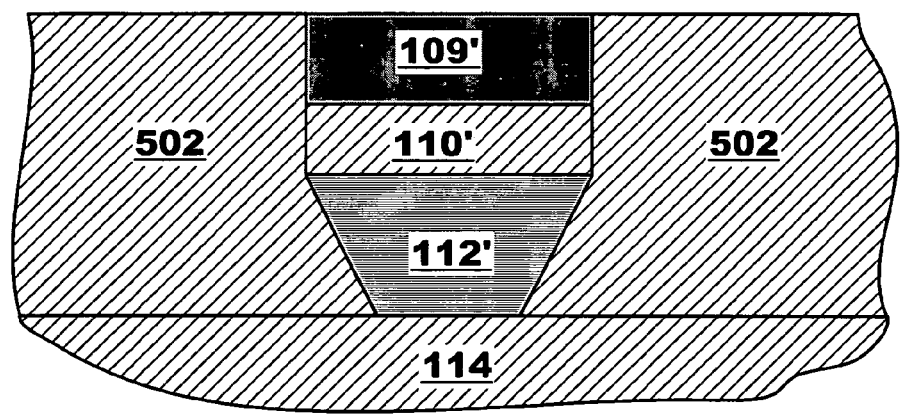
FIG. 6 is a partial cross sectional view looking into the air bearing surface (ABS) of the film structure subsequent to planarization by CMP, during fabrication of a perpendicular write head with a trailing shield, in accordance with an embodiment of the present invention.

In step 1312 of FIG. 13, the structure of FIG. 5 is planarized by CMP. FIG. 6 is a partial cross sectional view 600 looking into the air bearing surface (ABS) of the film structure subsequent to planarization by CMP, in accordance with an embodiment of the present invention. Planarization is slowed or terminated by DLC stop layer 109'.

Figure 7:
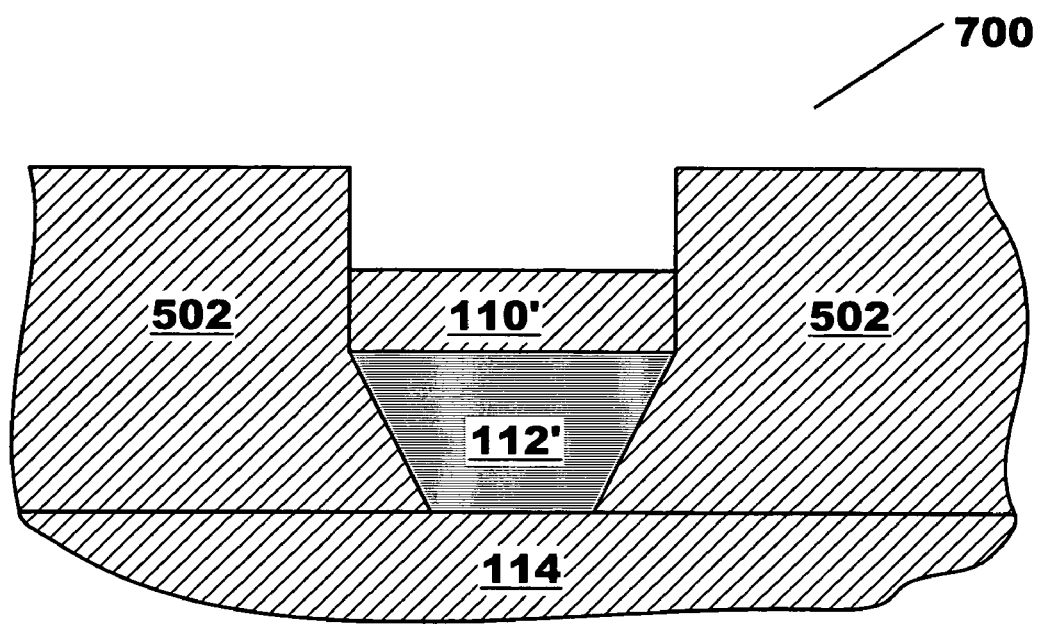
FIG. 7 is a partial cross sectional view looking into the air bearing surface (ABS) of the film structure subsequent to the removal of layer 109', during fabrication of a perpendicular write head with a trailing shield, in accordance with an embodiment of the present invention.

In step 1314 of FIG. 13, layer 109' is removed. FIG. 7 is a partial cross sectional view 700 looking into the air bearing surface (ABS) of the film structure subsequent to the removal of layer 109', in accordance with an embodiment of the present invention. Layer 109' is removed by an oxidation based RIE process suitable for the removal of DLC layers, well known to those skilled in the art.

In step 1316 of FIG. 13, the combined seed/capping layer 802 is deposited over the structure of FIG. 7. FIG. 8a is a partial cross sectional view looking into the air bearing surface (ABS) of the film structure subsequent to the deposition of seed/capping layer 802, in accordance with an embodiment of the present invention. FIG. 8b is a partial cross sectional view of detail 804 of FIG. 8a, in accordance with an embodiment of the present invention. Seed/capping layer 802 serves as conductive cathode layer for the subsequent deposition of the wrap around shield, which is usually deposited by electroplating. Prior to electroplating the shield, portions of the surface covered by seed/capping layer 802 need to be masked to define the locations to which the shield will be confined. The masking is performed by a photo resist layer, which must be exposed and developed to create the mask. The adhesion of the photo resist to the upper surface of seed/capping layer is essential to prevent under-plating of the shield, which is deposition of the shield metal under the photo resist layer. Under-plating compromises the accuracy of the mask, allowing deposition of shield metal in unwanted locations, and is therefore undesirable.

In the prior art, seed layers having upper surfaces of exposed precious metals such as Rh, can exhibit photo resist adhesion problems. To improve photo resist adhesion to the Rh seed layer, an inorganic $SiO_xN_y$, anti-reflective coating is often deposited over the Rh. Since this coating is non-conductive, it must be removed via an RIE process prior electroplating of the shield structure. While the ARC can be applied over precious metal seed layers to resolve the photo resist adhesion problems, the removal process can compromise the accuracy of the photo resist mask since the RIE removal process must be performed after the photo resist mask is fully formed. Exposure of the mask to RIE can damage portions of the mask, compromising critical dimension control. Another common seed layer material used in the prior art, containing alloys of Ni and Cr, does not have the photo resist adhesion problem, but can exhibit corrosion or oxidation problems after exposure to air and moisture. The oxides can be poor conductors, making plating of the shield layer difficult, non-uniform, or non-adherent. These oxides are also not easily removed by the plating bath chemistry, so they may remain on the seed layer surface during electroplating.

It is a main advantage of embodiments of the present invention to resolve the photo resist adhesion and corrosion problems of prior art seed layers without the need for a separate ARC layer that must be removed prior to electroplating. This is accomplished by providing a dual layer seed layer, or a base seed layer 802b with a conductive capping layer 802a that need not be removed prior to plating. A number of advantages of the present invention are evident. The base seed layer 802b can be chosen without concern for its corrosion performance, or photo resist adhesion performance. For example, if a high seed layer conductivity is desired, noble metals such as gold, silver, rhodium, platinum, palladium, or other precious metals may be used even though they may not have good photo resist adhesion. Conductive capping layer 802a provides an adhesive interface with the subsequently applied photo resist. In another example, cost may be an issue, suggesting the use of conventional NiCr (or another low cost material such as Ir) base seed layer. The oxide formation or corrosion of these cheaper base seed layers is suppressed through use of an appropriate capping layer 802a. For these base seed layers, capping layer 802b provides a adhesive interface to the plated shield.

Capping layer 802a can made from alloys of Co, Fe, and Ni, preferably alloys of CoFe, CoNiFe, or NiFe. Oxides of these alloys are easily removed in the plating bath chemistry during the deposition of the shield, allowing void free plating and good adhesion to the shield. Photo resist adhesion is also acceptable. The thickness of the capping layer 802a can range from 1 to 20 nm, preferably 2-5 nm. Base seed layer 802b can be comprised of: a noble metal such as Au, Ag, Pd, Pt, Rh, Ru, Ir, and Os; alloys of Ni and P; alloys of Ni and Cr; W, and Ta. Thickness for the base seed layer 802b can range from 1 to 100 nm, preferably 5 to 50 nm, and more preferably 20 to 30 nm. Deposition of seed layer/capping layer 802 can be performed by PVD, CVD, ion beam deposition, or any other method known to those skilled in the art.

Figure 9:
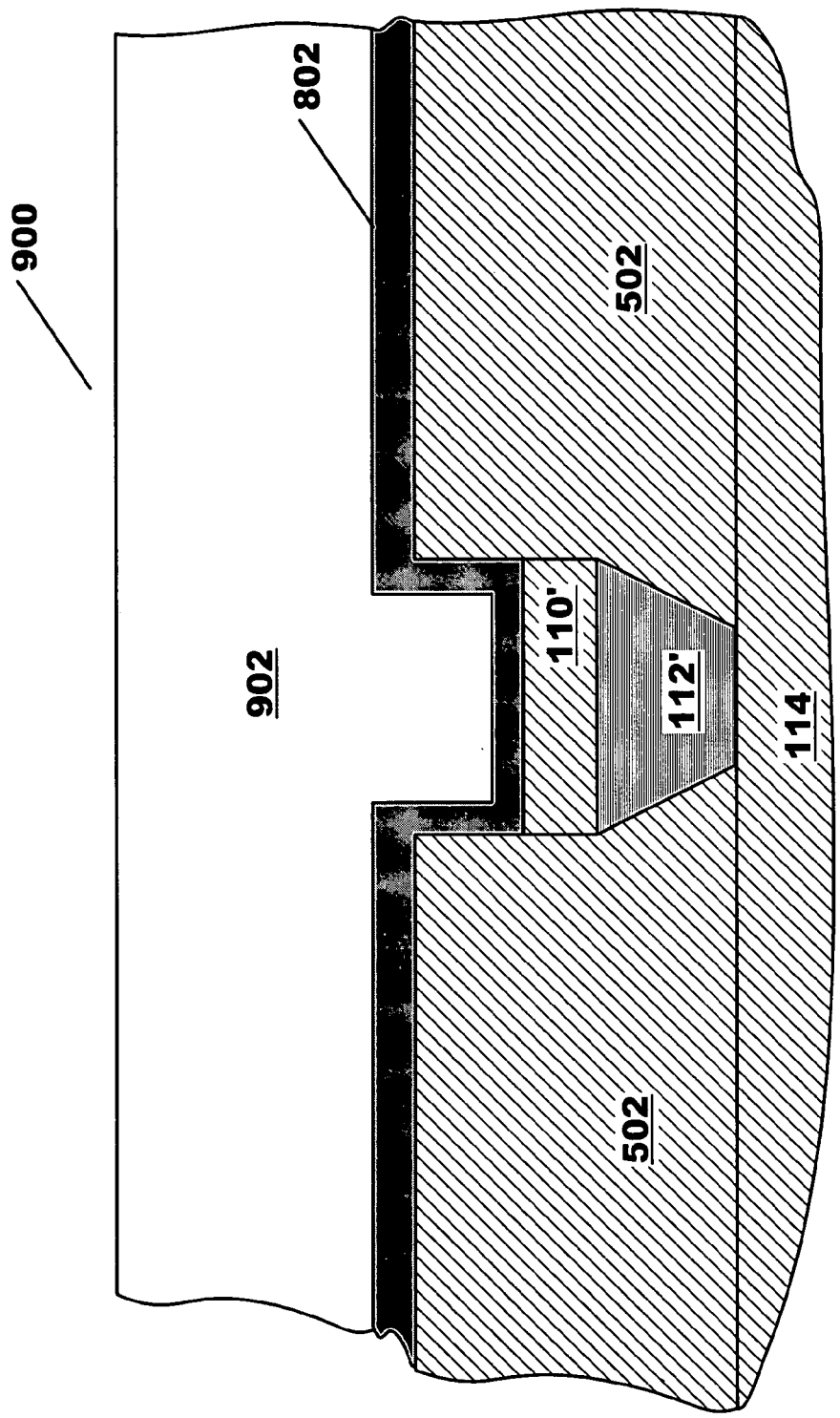
FIG. 9 is a partial cross sectional view looking into the air bearing surface (ABS) of the film structure subsequent to the deposition of photo resist layer 902, during fabrication of a perpendicular write head with a trailing shield, in accordance with an embodiment of the present invention.

Returning to FIG. 13, in step 1318 a blanket photo resist is deposited over seed/capping layer 802. FIG. 9 is a partial cross sectional view 900 looking into the air bearing surface (ABS) of the film structure subsequent to the deposition of photo resist layer 902, in accordance with an embodiment of the present invention.

Figure 10:
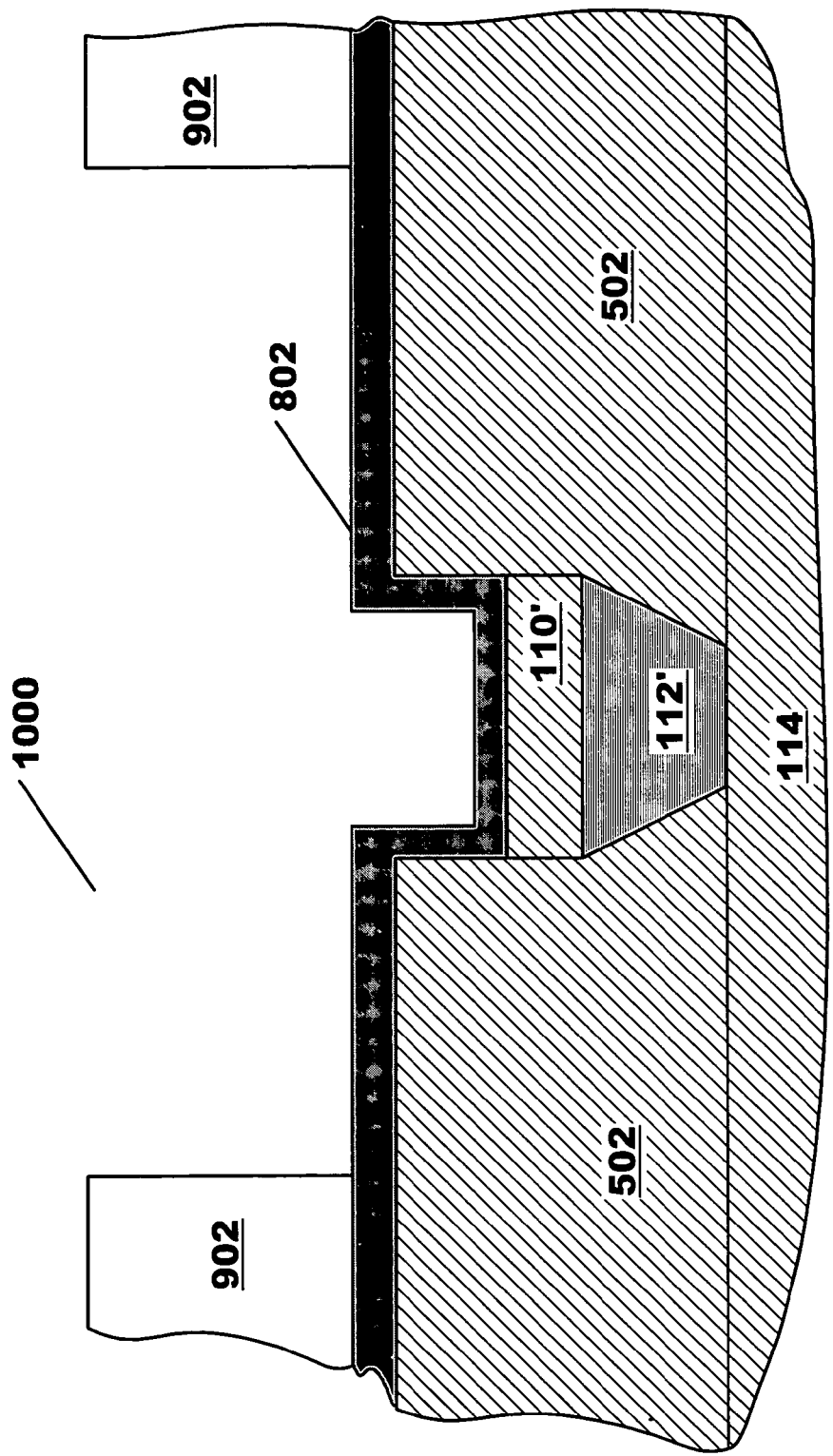
FIG. 10 is a partial cross sectional view looking into the air bearing surface (ABS) of the film structure subsequent to the imaging and development of photo resist layer 902, during fabrication of a perpendicular write head with a trailing shield, in accordance with an embodiment of the present invention.

In step 1320 of FIG. 13, photo resist layer 902 is imaged and developed in accordance with methods well known to those skilled in the art. FIG. 10 is a partial cross sectional view 1000 looking into the air bearing surface (ABS) of the film structure subsequent to the imaging and development of photo resist layer 902, in accordance with an embodiment of the present invention.

Figure 11:
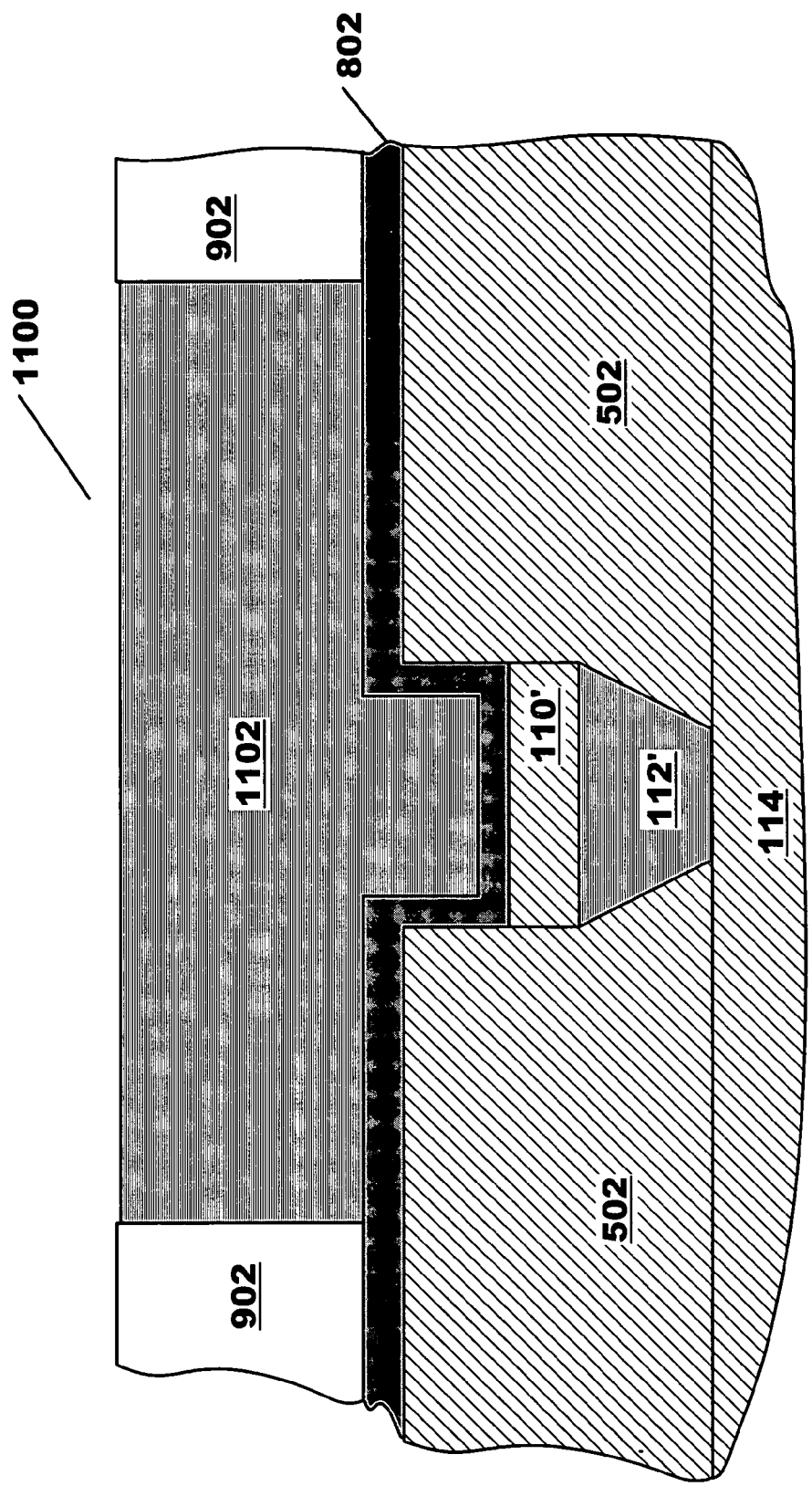
FIG. 11 is a partial cross sectional view looking into the air bearing surface (ABS) of the film structure subsequent to the deposition of shield layer 1102, during fabrication of a perpendicular write head with a trailing shield, in accordance with an embodiment of the present invention.

In step 1322 of FIG. 13, the trailing shield 1102 is deposited over seed/capping layer 802 via electroplating, a process well known to those skilled in the art. FIG. 11 is a partial cross sectional view 1100 looking into the air bearing surface (ABS) of the film structure subsequent to the deposition of shield layer 1102, in accordance with an embodiment of the present invention.

In step 1324 of FIG. 13, the photo resist layer 902 is removed by methods well known to skilled in the art. FIG. 12 is a partial cross sectional view 1200 looking into the air bearing surface (ABS) of the film structure subsequent to the removal of photo resist layer 902, in accordance with an embodiment of the present invention.

The forgoing discussion has been focused upon the process for making a perpendicular write head having a trailing shield. However, the suitability and application of seed/capping layers is not limited only to the production of trailing shields, but may be applied to perpendicular write heads having wrap around shields as well. For simplification, structures corresponding to process steps prior to seed/capping layer deposition are not shown for the wrap around shield.

FIG. 14a is a partial cross sectional view 1400 looking into the air bearing surface (ABS) of the film structure subsequent to the deposition of seed/capping layer 1402, during fabrication of a perpendicular write head with a wrap around shield, in accordance with an alternate embodiment of the present invention. In view 1400, tapered magnetic pole structure 112', gap layer 110', and side gap layer 503 have been previously deposited on substrate 114 by methods well known to those skilled in the art. FIG. 14b is a partial cross sectional view of detail 1404 of FIG. 14a, in accordance with an alternate embodiment of the present invention. The materials, thickness ranges, and other limitations disclosed above for base seed layer 802b and capping layer 802a apply equally to layers 1502a and 1502b for this alternative embodiment of the present invention.

Figure 15:
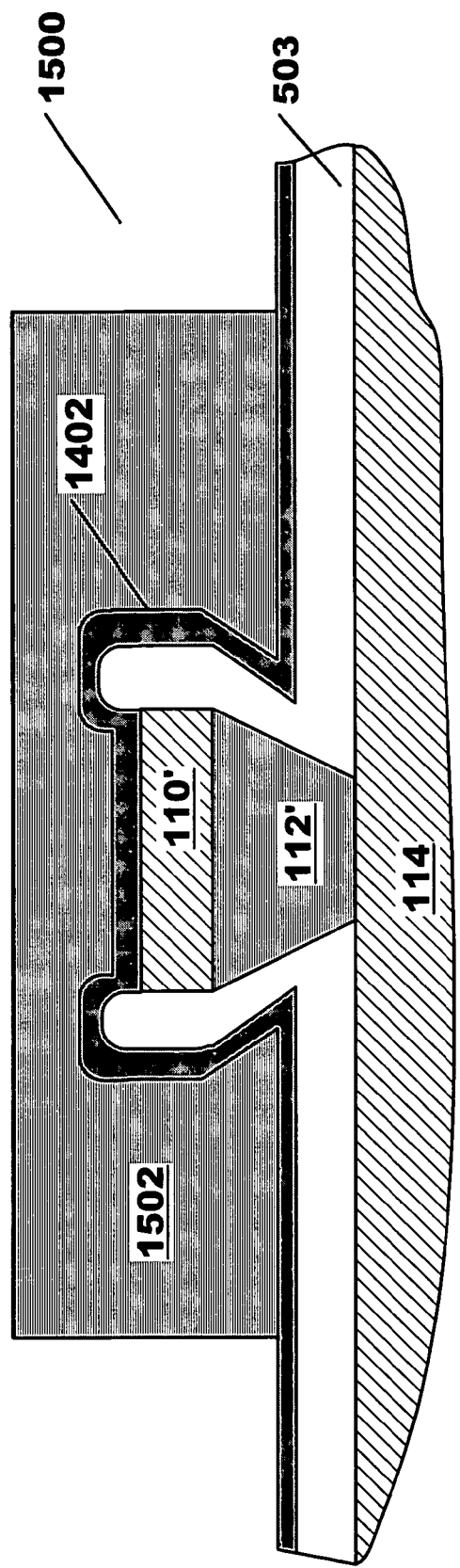

FIG. 15 is a partial cross sectional view 1500 looking into the air bearing surface (ABS) of the film structure subsequent to the deposition of wrap around shield 1502, in accordance with an alternate embodiment of the present invention. The

What is claimed is:

1. A method for making a perpendicular head comprising:
fashioning a pole structure on a surface of a substrate, said pole structure having a tapered pole section in contact with said substrate, and a gap layer deposited on said tapered pole section;
depositing a conductive base seed layer on said gap layer;
depositing a conductive capping layer on said conducive base seed layer;
depositing a photo resist layer over said capping layer;
removing a portion of said photo resist layer by imaging and developing said photo resist layer, exposing a portion of said conductive capping layer; and,
electroplating a shield layer over said portion of said conductive capping layer subsequent to removing said portion of said photo resist layer.

2. The method as recited in claim 1, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Co and Fe.

3. The method as recited in claim 2, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Co, Ni and Fe.

4. The method as recited in claim 1, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Ni and Fe.

5. The method as recited in claim 1, wherein said conductive base seed layer is between 1 and 100 nm thick, and said conductive capping layer is between 1 and 20 nm thick.

6. The method as recited in claim 5, wherein said conductive base seed layer is between 5 and 50 nm thick, and said conductive capping layer is between 2 and 5 nm thick.

7. A method for making a perpendicular head comprising:
fashioning a pole structure on a surface of a substrate, said pole structure having a tapered pole section in contact with said substrate, and a gap layer deposited on said tapered pole section;
depositing a conductive base seed layer on said gap layer;
depositing a conductive capping layer on said conducive base seed layer;
depositing a photo resist layer over said capping layer;
removing a portion of said photo resist layer by imaging and developing said photo resist layer, exposing a portion of said conductive capping layer; and,
electroplating a wrap around shield layer over said portion of said conductive capping layer subsequent to removing said portion of said photo resist layer.

8. The method as recited in claim 7, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Co and Fe.

9. The method as recited in claim 8, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Co, Ni and Fe.

10. The method as recited in claim 7, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Ni and Fe.

11. The method as recited in claim 7, wherein said conductive base seed layer is between 1 and 100 nm thick, and said conductive capping layer is between 1 and 20 nm thick.

12. The method as recited in claim 11, wherein said conductive base seed layer is between 5 and 50 nm thick, and said conductive capping layer is between 2 and 5 nm thick.

13. A method for making a perpendicular head comprising:
fashioning a pole structure on a surface of a substrate, said pole structure having a tapered pole section in contact with said substrate, and a gap layer deposited on said tapered pole section;
depositing a conductive base seed layer on said gap layer;
depositing a conductive capping layer on said conducive base seed layer;
depositing a photo resist layer over said capping layer;
removing a portion of said photo resist layer by imaging and developing said photo resist layer, exposing a portion of said conductive capping layer; and,
electroplating a trailing shield layer over said portion of said conductive capping layer subsequent to removing said portion of said photo resist layer.

14. The method as recited in claim 13, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Co and Fe.

15. The method as recited in claim 14, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Co, Ni and Fe.

16. The method as recited in claim 13, wherein
said conductive base seed layer comprises Au, Ag, Pd, Pt, Rh, Ru, Ir, Os, Ta and W; alloys of Ni and P; alloys of Ni and Cr; and,
said conductive capping layer comprises alloys of Ni and Fe.

17. The method as recited in claim 13, wherein said conductive base seed layer is between 1 and 100 nm thick, and said conductive capping layer is between 1 and 20 nm thick.

18. The method as recited in claim 17, wherein said conductive base seed layer is between 5 and 50 nm thick, and said conductive capping layer is between 2 and 5 nm thick.

* * * * *

UNITED STATES PATENT AND TRADEMARK OFFICE
CERTIFICATE OF CORRECTION

PATENT NO. : 7,536,777 B2
APPLICATION NO. : 11/595764
DATED : May 26, 2009
INVENTOR(S) : Hieu Lam et al.

It is certified that error appears in the above-identified patent and that said Letters Patent is hereby corrected as shown below:

TITLE PAGE:

ITEM (75): Delete inventor "Patrick Rush Webb"
ITEM (75): Add inventor Aron Pentek Signed and Sealed this
Tenth Day of March, 2015

Michelle K. Lee
*Deputy Director of the United States Patent and Trademark Office*